United States Patent [19]

Berg

[11] Patent Number: 4,508,097
[45] Date of Patent: Apr. 2, 1985

[54] SELF CLEANING INDOOR BARBECUE GRILLER

[76] Inventor: Keith E. Berg, 42 Weir Crescent, Lurnea NSW 2170, Australia

[21] Appl. No.: 448,899

[22] PCT Filed: Apr. 13, 1982

[86] PCT No.: PCT/AU82/00057
§ 371 Date: Dec. 8, 1982
§ 102(e) Date: Dec. 8, 1982

[87] PCT Pub. No.: WO82/03544
PCT Pub. Date: Oct. 28, 1982

[30] Foreign Application Priority Data

Apr. 10, 1981 [AU] Australia ............... PE8409

[51] Int. Cl.³ .................................. F24C 3/00
[52] U.S. Cl. ............................. 126/41 R; 126/21 R; 126/299 D; 99/400; 99/446; 219/400; 219/460
[58] Field of Search ............... 99/400, 446; 126/21 R, 126/25 R, 25 A, 41 R, 39 M, 299 R, 299 C, 299 D; 219/391, 400, 460, 385

[56] References Cited

U.S. PATENT DOCUMENTS

| | | | |
|---|---|---|---|
| 3,286,620 | 11/1966 | Brown | 126/41 R X |
| 3,348,472 | 10/1967 | Anetsberger et al. | 126/41 R X |
| 3,444,805 | 5/1969 | Happel et al. | 126/299 R X |
| 3,474,724 | 10/1969 | Jenn | 126/299 R X |
| 3,712,819 | 1/1973 | Field | 126/299 R X |
| 3,745,912 | 7/1973 | Field | 99/446 |
| 3,757,671 | 9/1973 | Warshaver et al. | 99/400 |
| 3,938,494 | 2/1976 | Clark | 126/41 R |
| 4,034,662 | 7/1977 | McLane | 99/445 |
| 4,034,663 | 7/1977 | Jenn et al. | 99/446 |

Primary Examiner—Margaret A. Focarino
Attorney, Agent, or Firm—McAulay, Fields, Fisher, Goldstein & Nissen

[57] ABSTRACT

The present invention relates generally to an indoor barbecue griller in which substantially all fat and other cooking residues are vaporized. Previously it had been the custom to catch fat and the like in a tray under the heating means for later withdrawal. Due to the fire risk, it had previously been the practice to keep the container and its environs as cool as possible. The present invention provides that the collection receptacle take the form of an absorbent tray which is heated by reflection and refraction from the heating means and refractory material, said tray being surrounded by a heavily insulated enclosure provided with copious quantities of air to assist instantaneous combustion. A plenum chamber assists the control of combustion of said residues.

14 Claims, 4 Drawing Figures

SELF CLEANING INDOOR BARBECUE GRILLER

TECNICAL FIELD

The present invention relates generally to grilling appliances and more particularly to a barbecue appliance in which fat and cooking residues are incinerated.

BACKGROUND ART

Many attempts have been made to collect food and grease residues produced while grilling or charbroiling meat and other foods. The most widely used method is to collect the residues below the food in a collection tray or other receptacle which must be emptied periodically. In all types of grillers this operation is inconvenient and time consuming, and on barbecue grillers the collection tray presents a serious risk of fire. The practice of disposing of a proportion of cooking residues produced in a barbecue griller by the use of a so-called "volcanic rock" bed has provided a partial answer to the problem of grease disposal. By this method a layer of porous rock material is placed on a mesh tray located below the cooking surface with the result that some of the residues are burnt. This practice still requires the use of a grease collection tray which, because it is often exposed to considerable reflected heat from the rocks above offers increased risks of fire in addition to the inconvenience of disposal and cleaning.

DISCLOSURE OF INVENTION

In one form the present invention provides a cooking appliance having a horizontal cooking surface having slotted openings extending from its upper surface to its lower surface, a tray of porous "volcanic rock" material located horizontally beneath the cooking surface, a heating element comprising two gas burners located directly below the rock tray, an absorbent tray containing absorbent material located beneath the burners and lying in the horizontal plane, an insulated enclosure which contains, insulates and locates the aforementioned components and in one end of which is formed a rectangular aperture, a metal outer casing which forms a plenum chamber adjacent to the aperture, and a louvre segment located on the upper surface of the plenum chamber substantially level with the cooking surface.

Cooking action is carried out by a stream of hot gas flowing through the slots in the cooking surface and by radiated heat emanating from the volcanic rock and the heating element itself. Heat is imparted to the wall of the enclosure thence into the lower surface of the absorbent tray and into the absorbent, and directly into the upper surface of the absorbent by radiation from the hot rocks and heating element. Air is drawn in large quantity downwards through the register into the plenum chamber from where it passes over the hot absorbent and rises inside the enclosure passing around the heating element and volcanic rocks and leaving the apparatus through the slots in the cooking surface. Grease which falls onto the absorbent is slowly vapourised and burnt in the incoming stream.

Thus there is provided a barbecue griller in which all grease and food particles are incinerated and which is reliable, functional, easy to install and which presents a pleasing appearance in the kitchen.

BRIEF DESCRIPTION OF DRAWINGS

While the present invention is susceptible of various modifications and alternative contructions, one embodiment is shown in the drawings and will be described herein. However, it should be understood that it is not intended to limit the invention to the particular form disclosed, but on the contrary, the intention is to cover all modifications and alternative constructions falling within the scope of the invention.

FIG. 1 is an isometric view of an exemplary apparatus embodying the features of the present invention here depicting the fascia, cooking surface, air louvre, control knobs and the outer casing.

FIG. 2 is a sectional view through the side of the apparatus.

FIG. 3 is a plan view of the cooking surface, fascia, louvre and control knobs from which the view in FIG. 2 is geometrically projected.

FIG. 4 is an exploded isometric view of the apparatus as depicted in FIG. 1.

BEST MODE OF CARRYING OUT THE INVENTION

Figure 1:
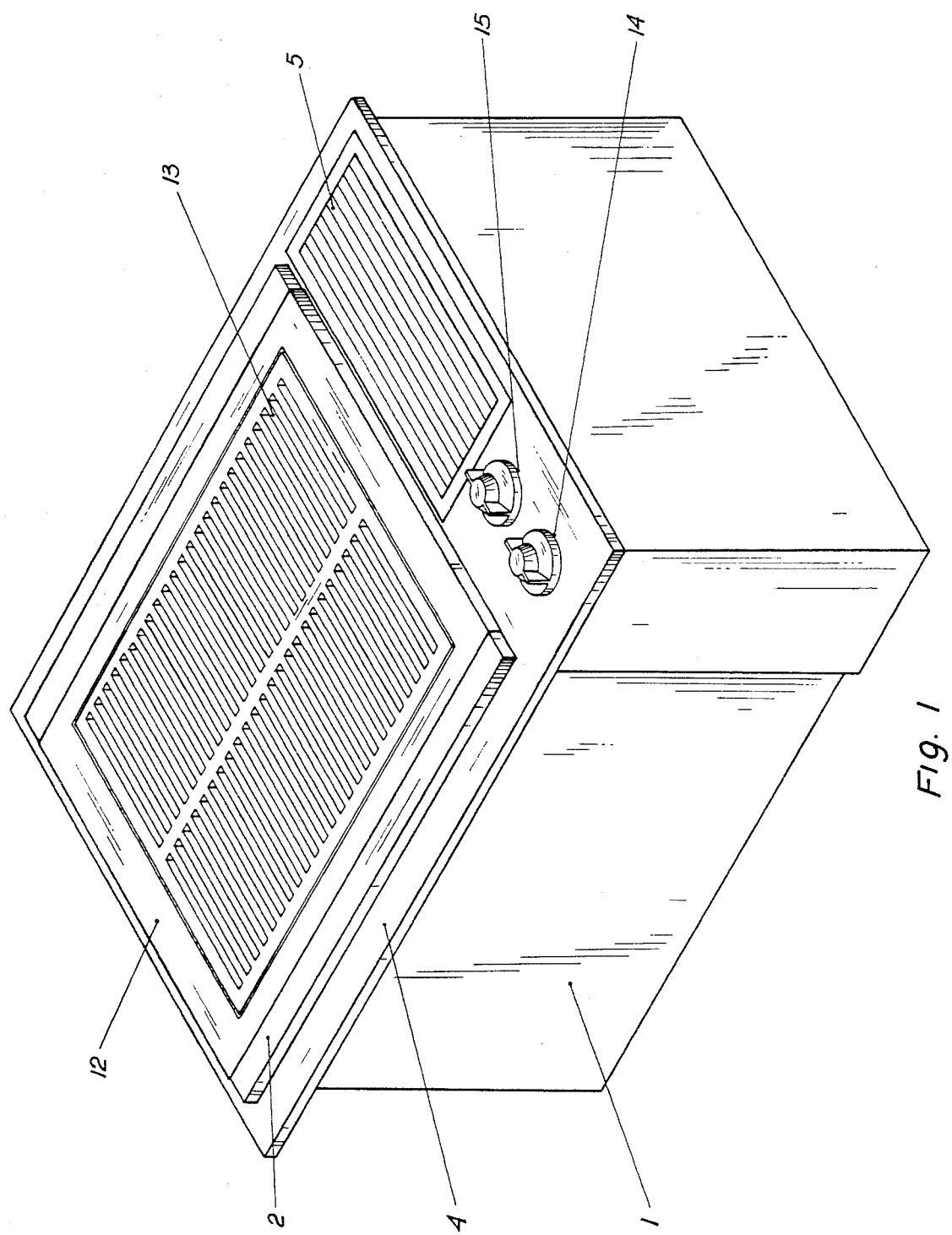
Referring now to FIGS. 1-4.
Figure 3:
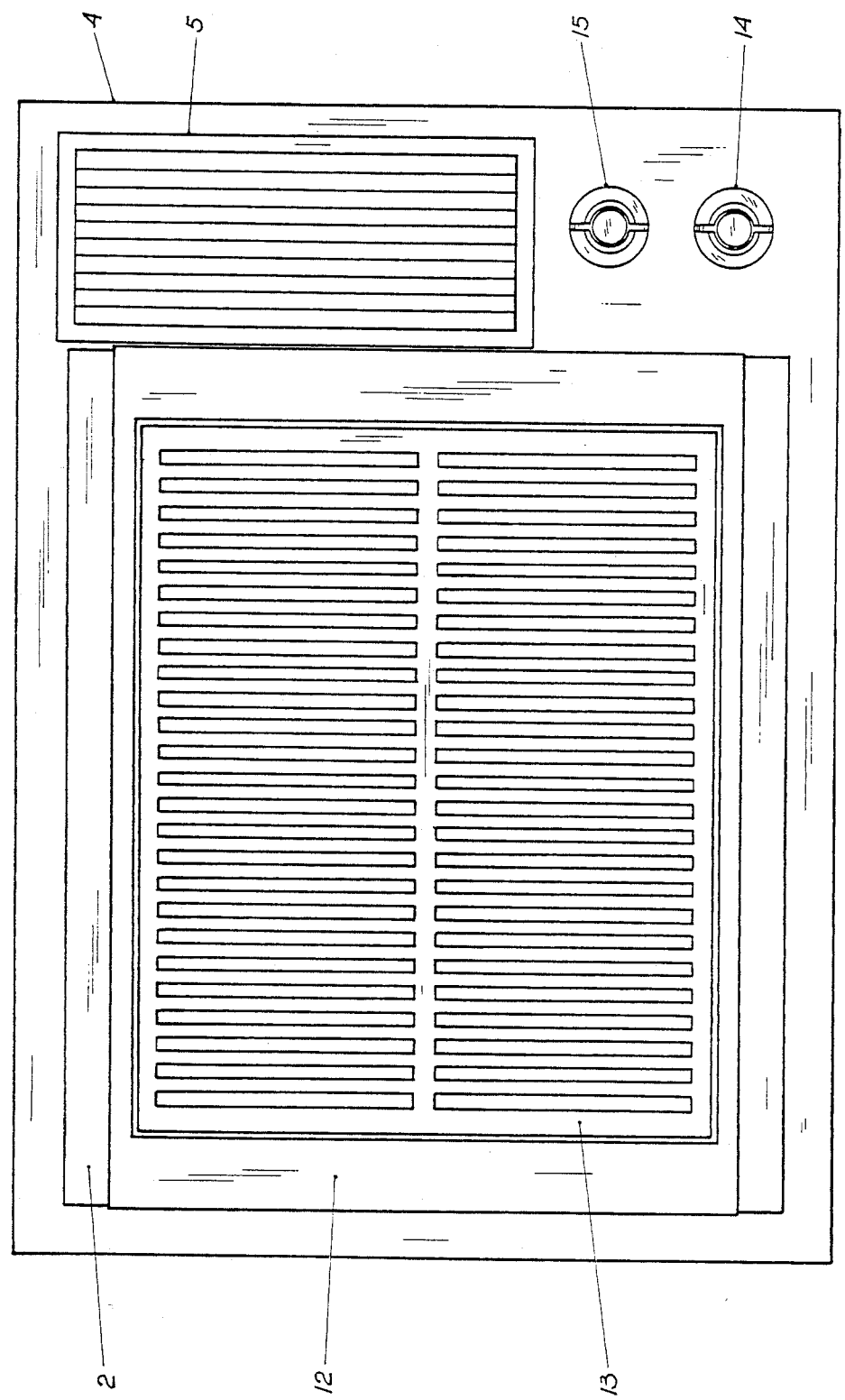

Referring to FIGS. 1 and 3 the cooking surface 13 is shown supported in the surround 12 which in turn is suspended in the main enclosure 2. It is understood that the cooking surface may take the form of any grating, griddle plate or rotisserie or other insert which may suit the cooking application in hand, and still be within the scope of the invention. The cooking surface surround 12 directs fat to an area within the perimeter of the absorbent tray 6 and may take a number of different shapes.

Figure 2:
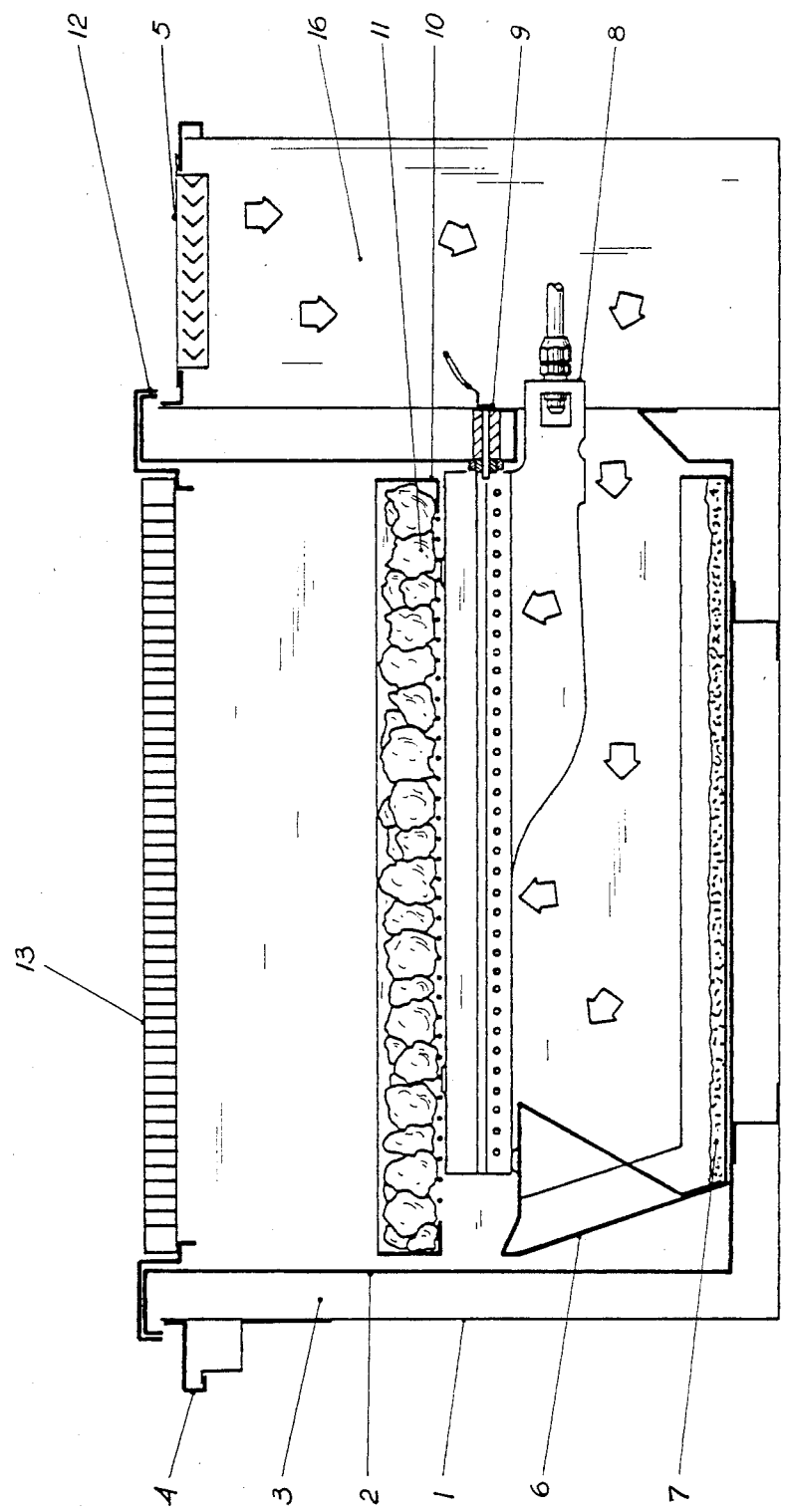

FIG. 2 depicts the apparatus in section and illustrates the passage of air through the appliance, specifically down through the register 5, through the plenum chamber 16 into the insulated enclosure 2 and upward past the heating elements through the rock tray and rocks 10 and 11 and out through the cooking surface 13. Introducing air through the lower parts of the appliance which may be used in this apparatus without departing from the scope of the invention. The air register 5 is shown as a chevron louvre which lifts out for cleaning, but the invention is equally applicable with air ingress provided around the perimeter of the fasica 4 or through the outer casing 4 or through several other locations through any shape of aperture.

Figure 4:
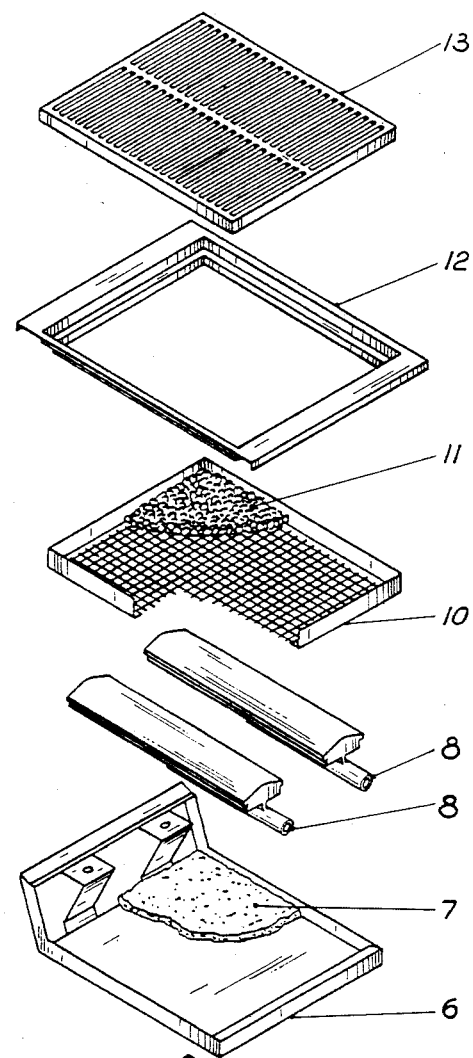
Figure 4:
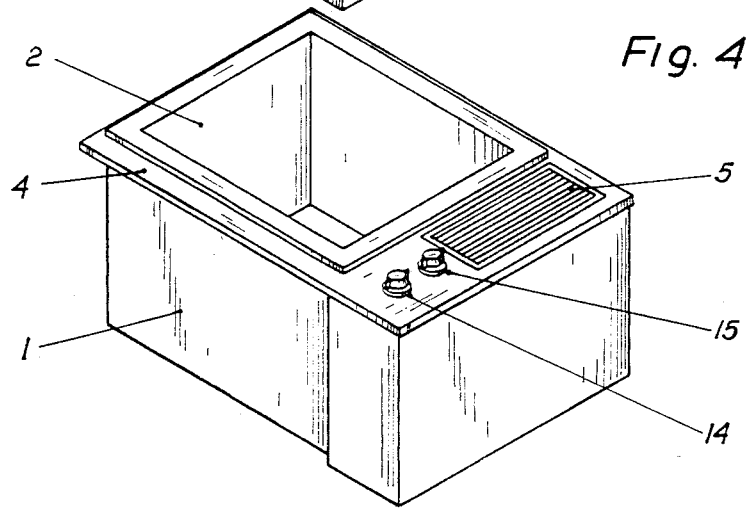

FIG. 4 is an exploded isometric view depicting the various components. The volcanic rocks 11 in the exemplary apparatus serve to aid the cooking process in the traditional way, and to reflect heat onto the absorbent 7 in the tray 6 beneath. The temperature of the absorbent is critical to the effective vapourisation of the grease residues, and it is understood that the exemplary apparatus displays only one of a number of methods of heating the absorbent which are within the broad scope of the invention.

The heating element 8 is depicted as a pair of gas burners with an ignition electrode 9 but alternative forms of gas firing or electric element heating are equally within the scope of the invention.

Heat transfer between the base of the enclosure 2 and the lower surface of the absorbent tray 6 is facilitated by heavy insulation 3 of the enclosure.

The absorbent 7 may be composed of any of a number of materials which are porous and impervious to heat; attapulgite and diamotaceous earth have been found most effective.

The claims defining the invention are as follows.

I claim:

1. A cooking appliance comprising:
an outer casing with an upper horizontal cooking surface having at least one vent therein:
heating means under said surface and a layer of absorbent material thereunder, said outer casing being internally provided with an insulated enclosure, said enclosure substantially enclosing said heating means and absorbent material, said enclosure having at least one aperture therein providing access from a plenum chamber formed between said outer casing and said enclosure and at least one aperture in said plenum chamber below the heating means allowing the ingress of air through said plenum chamber, into said insulated enclosure and discharge through said at least one vent, said appliance operating such that the absorbent material is heated to sufficiently high temperatures to vaporize food material deposited on same; and
said absorbent material is porous and substantially impervious to heat, said absorbent material being selected from the group consisting of attapulgite and diatomaceous earth;
said absorbent material is supported in a tray occupying substantially all of the base of the insulated enclosure.

2. A cooking appliance as claimed in claim 1 wherein the inner surface of the insulated enclosure comprises conductive material to assist the raising of the temperature of the absorbent material.

3. A cooking appliance as claimed in claim 1 wherein a relatively large amount of air is drawn into the appliance via the plenum chamber, and said at least one plenum chamber aperture is adjustable to vary the ingress of air.

4. A cooking appliance comprising an outer casing, an enclosure spaced inwardly of said outer casing, a layer of thermal insulation sandwiched between said outer casing and said enclosure, a horizontal cooking surface forming the top of said enclosure and having at least one vent therein, radiant heating means spanning across said enclosure at a level beneath said cooking surface, said heating means including means porous to liquid fat dropping thereon from the cooking surface, a tray supported beneath said heating means and towards which liquid fat drops when falling from the heating means, a layer of fat-absorbent and substantially heat-impervious material on said tray, and an inlet permitting combustion air to enter said enclosure beneath the heating means, said appliance operating by generating sufficient heat within the vicinity of the absorbent layer to vaporize and combust food material deposited thereon.

5. An appliance as claimed in claim 4, wherein the tray and enclosure are made of material having good thermal-conducting properties and the tray rests on the floor of the enclosure in good thermal contact therewith.

6. An appliance as claimed in claim 5, including an air-plenum chamber lying against and defined in part by the outer casing, said chamber having air-admission vents opening to atmosphere at its upper end and a side outlet communicating with the interior of the enclosure for admitting combustion air thereto between the levels of the heating means and the absorbent layer therein.

7. An appliance as claimed in claim 6, in which said plenum chamber is provided with means for varying the ingress of air thereto.

8. An appliance as claimed in claim 7, in which said heating means comprises a horizontally-extending layer of volcanic rock beneath which are disposed heat-generating means for raising the temperature of said rock to a temperature at which it radiates heat upwardly towards said cooking surface and downwardly towards said absorbent layer.

9. An appliance as claimed in claim 8, wherein said absorbent material is a material selected from the group consisting of attapulgite and diatomaceous earth.

10. A cooking appliance comprising:
an outer casing with an upper horizontal cooking surface having at least one vent therein;
said outer casing being internally provided with an insulated enclosure;
said enclosure substantially enclosing said heating means and an absorbent material selected from the group consisting of attapulgite and diatomaceous earth;
said enclosure having at least one aperture therein providing access from a plenum chamber formed between said outer casing and said enclosure and at least one aperture in said plenun chamber below the heating means allowing the ingress of air through said plenum chamber, into said insulated enclosure and discharge through said vents;
said absorbent material being supported in a tray occupying substantially all of the base of said insulated enclosure;
said appliance operating such that the absorbent material is heated to sufficiently high temperatures to vaporize food material deposited on same; and
a layer of refractory material being provided between said cooking surface and said heating means, said refractory material being porous volcanic rock; and
said heating means comprises at least one gas burner.

11. A cooking appliance as claimed in claim 10 wherein said absorbent material is porous and substantially impervious to heat.

12. A cooking appliance as claimed in claim 10 wherein the inner surface of the insulated enclosure comprises conductive material to assist the raising of the temperature of the absorbent material.

13. A cooking appliance as claimed in claim 12 wherein a relatively large amount of air is drawn into the appliance via the plenum chamber.

14. A cooking appliance as claimed in claim 13 wherein said at least one plenum chamber aperture is adjustable to vary the ingress of air.

* * * * *